INVENTORS.
RICHARD H. PREWITT &
THOMAS H. PURCELL, Jr.
BY

ATTORNEY

INVENTORS
RICHARD H. PREWITT &
THOMAS H. PURCELL, Jr.
ATTORNEY

Feb. 26, 1963  R. H. PREWITT ETAL  3,078,911
APPARATUS FOR THE ASSEMBLY OF AN AIRFOIL
Original Filed Jan. 7, 1953  11 Sheets-Sheet 11

FIG.18  FIG.19

INVENTORS.
RICHARD H. PREWITT &
THOMAS H. PURCELL, Jr.
BY
ATTORNEY

United States Patent Office 3,078,911
Patented Feb. 26, 1963

3,078,911
APPARATUS FOR THE ASSEMBLY OF AN AIRFOIL
Richard H. Prewitt, Wallingford, and Thomas H. Purcell, Jr., Springfield, Pa., assignors, by mesne assignments, to Prewitt Plastics Company, a corporation of Philadelphia
Original application Jan. 7, 1953, Ser. No. 330,126, now Patent No. 2,961,053, dated Nov. 22, 1960. Divided and this application Mar. 27, 1959, Ser. No. 814,656
13 Claims. (Cl. 156—581)

This invention relates to airfoils and airframes for aircraft and other aerial devices of all types, and particularly to rotor blades for helicopters or other rotary wing aircraft. It is also applicable to other structures wherein a high ratio of strength to weight is desirable.

This application is a division of application Serial No. 330,126, filed January 7, 1953, now U.S. Patent No. 2,961,053.

Illustrative of the preferred practice of this invention, a substantially all metal and substantially hollow rotor blade is contemplated, having a main stress-resisting structure the walls of which are built up of thin sheets or laminations of a suitable material, preferably stainless steel, together with an associated web, an associated secondary, stiffening structure of a suitable metal or combination of metals, preferably steel reinforced aluminum, and an enclosing envelope or skin consisting of a thin sheet of a suitable metal, again preferably stainless steel, all arranged to define and maintain the selected external contour and airfoil shape. Assembly and fastening of the various blade components is accomplished through the use of suitable adhesive materials, a method comprising prescribed sequential applications of pressure and heat, and the utilization of apparatus and tools specifically developed to facilitate the carrying out of such method.

One of the principal objects of the invention is the realization of a closer approach to the ideal construction of an airfoil or airframe structure as indicated by fundamental design considerations than has been achieved by previously known constructions, resulting in a structure of superior efficiency, with fewer constituent parts, with increased strength to weight ratio, and increased accuracy of external contour, and enabling simpler, cheaper and faster methods of fabrication and assembly. It is particularly adaptable to the construction of rotor blades for large diameter rotor systems, and to quantity production methods.

A further advantage of this invention is the greater homogeneity and improved uniformity of construction from blade to blade resulting therefrom, with consequent minimizing of the problem of balancing the blades intended for use in the same rotor system.

Emergence of the successful application of adhesives to the high strength bonding of metal to metal has materially facilitated progress toward realization of ideal design characteristics in, as well as simplicity and flexibility in the methods and apparatus for construction of, the fabricated structures of airfoils and airframes. However, there have been definite limitations in the types and methods of construction advanced and utilized prior to the present invention. In the design of a rotor blade, for instance, stress analysis will reveal the ideal distribution of strength characteristics throughout the structure, both spanwise and chordwise. Generally speaking, blade section design is a function of spanwise location. The root section must be designed for high centrifugal and static bending loads. The mid-section must be designed for moderate centrifugal loads combined with repeated bending stresses. The tip section must be designed to attain good chordwise balance and yet be strong enough to take the high air loads imposed when the blade tip experiences super-critical airspeeds. The objective is to adhere as closely as possible to the strength distribution indicated by this analysis in the fabricated structure, to achieve the lightest possible structure consistent therewith. Up to the time of this invention perhaps the most successful effort to achieve this objective has consisted in the utilization of a single tube to form, either by drawing or by machining or by a combination thereof, a structural spar element or member, sometimes assuming the shape of the nose contour. It is in this element of the blade assembly that the main weight or mass and stress-resisting strength of the blade is concentrated. These types of structure and methods of fabrication are not sufficiently flexible or adaptable to achieve optimum weight and strength distribution; they have been devised primarily for other than adhesive means of fastening or assembling; they require expensive tooling and time-consuming operations; they are wasteful of material; and they are prohibitive in the construction of large diameter type blades which are coming more and more into demand. It is accordingly a paramount objective of this invention to provide a structure largely overcoming these defects and adapted to achieve to the fullest extent possible the advantages of metal to metal adhesive bonding. The methods and apparatus utilized in the fabrication of the structure of this invention, contributing as they do to the achievement of its various objectives, are important parts thereof, as are the closely inter-related component parts of the overall blade assembly.

How the foregoing and other objectives which will be made apparent hereinafter are attained will appear more fully in the following description, referring to the accompanying drawings wherein:

FIGURE 10 is the nose portion of a root end cross-section of the rotor blade of FIGURE 1, and FIGURE 11 is the nose portion of a tip and cross-section thereof, showing the placement therein of pressure apparatus and tools used in the first stage of the process of assembling the blade;

Referring now to the drawings in detail, the rotor blade 31 is of all metal substantially hollow construction and has uniform aerodynamic contour and chord throughout the greater portion of its length, and optimum twist. It has for its main strength member or spar an enclosed hollow laminated structure, generally D-shaped in cross-section, comprising roughly the forward one-fifth or one-third portion of the blade and consisting of a series of stainless steel sheets 32, each approximately .010" thick, formed to assume the shape of the nose external contour and adhesively bonded together, and a vertical web 33 of stainless steel, approximately .10" thick, constituting the rear wall thereof. Supporting angle stripe 34, also built up of a series fo .010" stainless steel sheets, reinforce the attachment of web 33 to the structure, adhesive bonding being used for this purpose as well.

Figures 1, 1A, 1E:
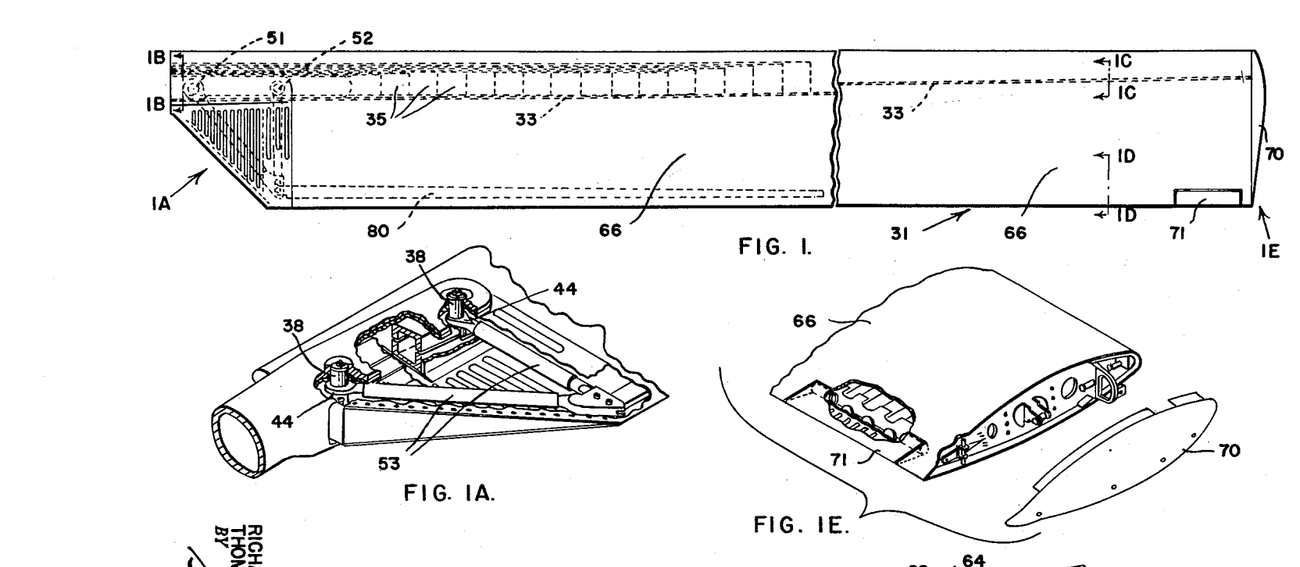
FIGURE 1 is a plan view of a typical rotor blade embodying the features of this invention, showing the general arrangement thereof.
FIGURE 1A is an enlarged perspective cutaway view of the root retention system of the rotor blade of FIGURE 1, indicated at 1A.
FIGURE 1E is an enlarged exploded perspective view showing details of the blade tip and trim tab assembly of FIGURE 1, indicated at 1E.
Figure 1B:
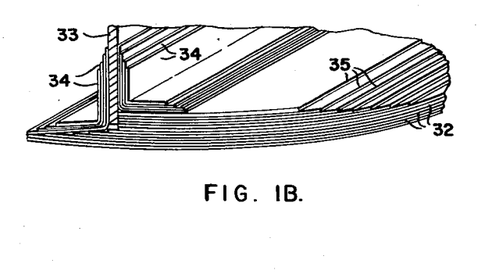
FIGURE 1B is an enlarged partial perspective sectional view along line 1B—1B of FIGURE 1, showing details of the inboard or root blade portion laminated nose construction with supplemental reinforcing laminations and with spar web and angle lamination supports.
Figure 2:
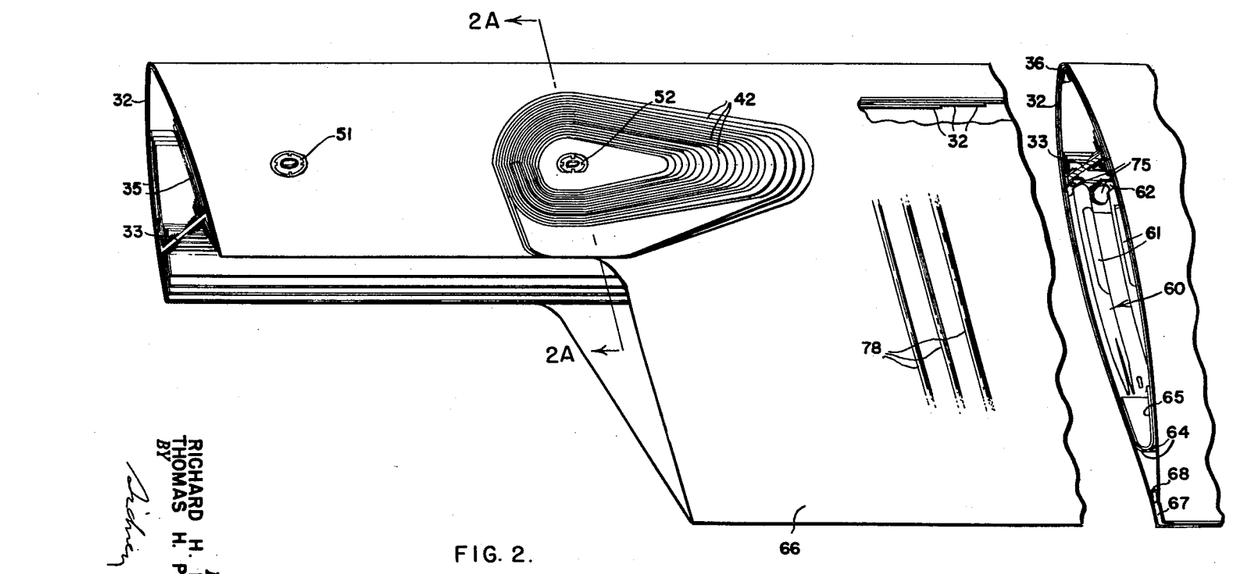
FIGURE 2 is an enlarged perspective cutaway view of portions of the rotor blade of FIGURE 1, showing details of the laminated construction of the nose or leading edge portion and variation therein along the span of the blade, also details of the internal construction of the aft portion of the blade, and "dimpling" of the skin aft of the spar web.

In the inboard portion of the spar, the wall thickness near web 33 is reinforced as needed by supplemental laminations of stainless steel sheets 35, approximately .010" thick, internally of, contiguous with and bonded to sheets 32, extending forward from the top and bottom portions of the forward face of the web 33 varying distances short of the leading edge, as shown in FIGURE 1B, and extending outboard varying distances as shown in FIGURE 1. At the tip of the spar, additional nose laminations 36, of stainless steel sheet, approximately .010" thick, internally of, contiguous with, and bonded to sheets 32, at the smallest radius curvature portion of the leading edge of the spar and extending aft along the top and bottom walls varying distances substantially short of the web 33, may be added for chordwise balancing purposes if necessary, as shown in FIGURE 2.

Figures 1C, 1D:
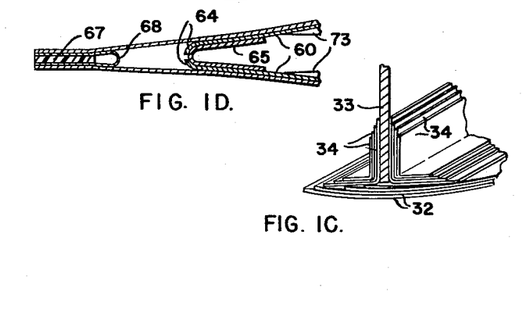
FIGURE 1C is an enlarged partial perspective sectional view along line 1C—1C of FIGURE 1, showing the details of the outboard or tip blade portion laminated nose construction with spar web and angle lamination supports.
FIGURE 1D is an enlarged sectional view along line 1D—1D of FIGURE 1, showing details of the blade trailing edge construction.
Figures 3, 3A, 3B:
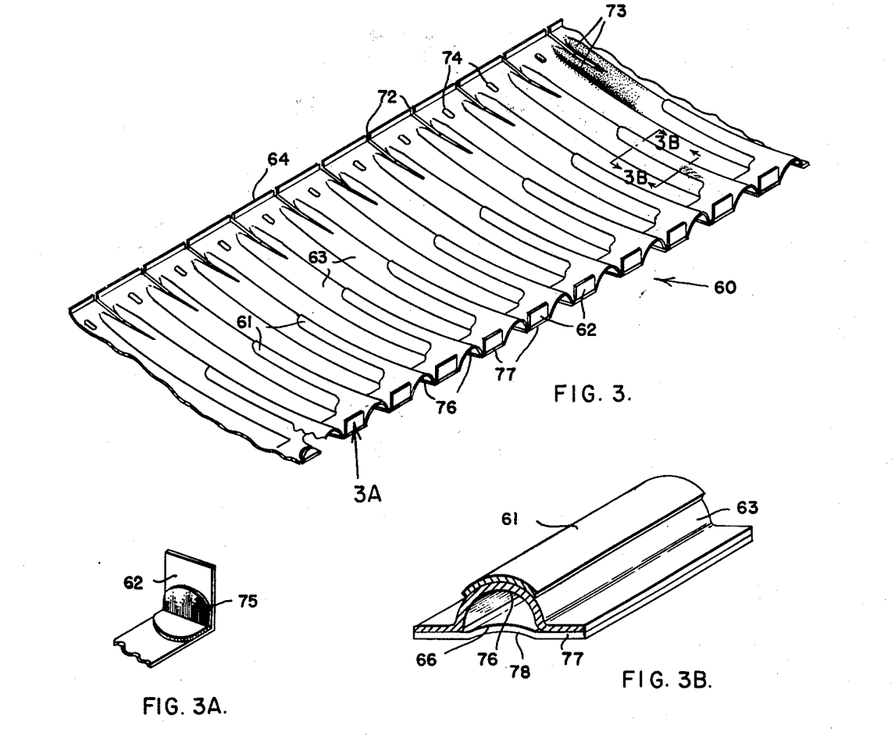
FIG. 3 is a perspective detail view of a portion of the continuous beaded and reinforced stiffener comprising the internal structure of the aft portion of the rotor blade.
FIGURE 3A is a perspective detail view of a portion of the stiffener assembly of FIGURE 3, indicated at 3A, showing "dot" reinforcement of the shear tabs.
FIGURE 3B is a sectional perspective view of a portion of the stiffener assembly of FIGURE 3, taken between lines 3B—3B, with associated skin portion attached thereto, and showing, in exaggerated form, the "dimpling" of the skin.

A secondary stiffening structure is incorporated into the remaining portion of the blade aft of the web 33 and comprises two continuous beaded stiffener members 60 made of aluminum with reinforcing stainless steel caps 61, as shown in FIGURE 3. Stiffener members 60 are adhesively bonded to the top and bottom portions of the aft face of web 33 and supporting angle strips 34, as indicated in FIGURE 2, shear tabs 62 providing additional surfaces for attachment to the web. Positioning of stiffener members 60 is such that their beads 63 run in the chordwise direction and have their convex surfaces facing inwardly of the structure toward each other, but separated from each other to form a substantially hollow structure. The aft edges 64 of the top and bottom stiffener members 60 are adhesively bonded together through the medium of an internal reverse strip 65 of stainless steel, being appropriately curved to assume the outer contour of the reverse strip 65, as indicated in FIGURE 3 and best shown in FIGURE 1D.

Figure 2A:
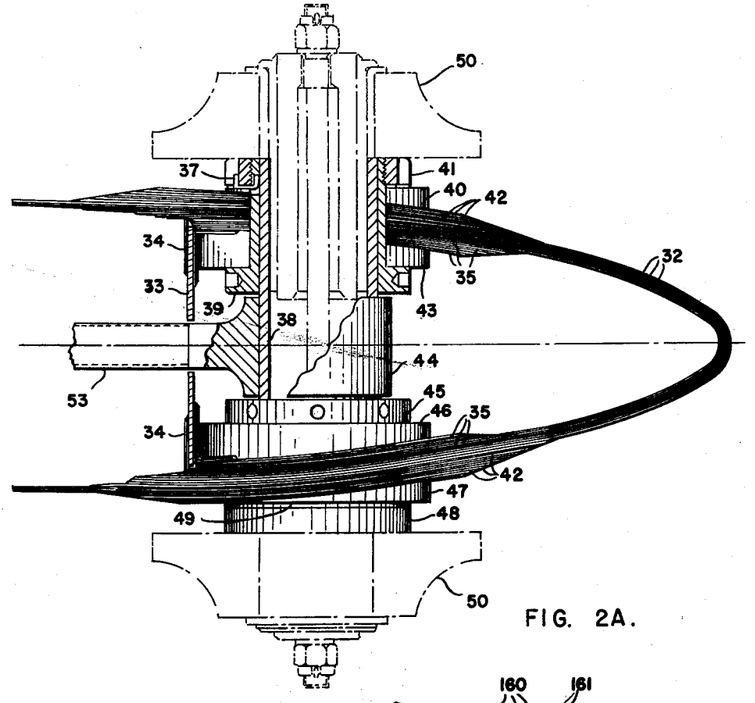
FIGURE 2A is an enlarged sectional view along line 2A—2A of FIGURE 2, showing further details of the laminated construction of that portion of the blade, as well as pin assembly means forming part of the root retention system.

Suitable root retention and rotor hub attachment means, such, for instance, as illustrated in FIGURES 1A and 2A, are incorporated into the inboard end of the blade structure. Holes 51 and 52 are bored through the top and bottom walls of the laminated structure of the blade assembly in its inboard portion forward of the web 33, as best shown in FIGURE 2. External laminated bosses, comprising series of sheets of stainless steel 42, approximately .010" thick, adhesively bonded together and to skin lamination 66, reinforce holes 52, as shown in FIGURES 2 and 2A. Holes 52 are provided with clamping assemblies made up of external spacers 40 and 47, and internal spacers 43 and 46, adhesively bonded to the respective spar wall surfaces as shown, bushings 39 and 45, extending through holes 52 and the respective spacers, and lockwashers 37 and 49, and nuts 41 and 48, completing the assemblies which are seen to provide effective clamping action holding together the laminations through which holes 52 are bored. Bushings 39 and 45 are bored, and pin 38, assembled with lug 44 of strut 53, is shrunk fit into the bushings, extending through the blade structure as shown. Pin 38 is then bored to provide access for rotor hub attachment means 50, as indicated in block outline in FIGURE 2A. Holes 51 are provided with similar means, except that external laminated bosses are not needed therefor.

Figure 5:
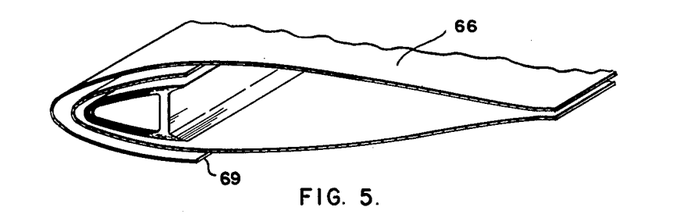
FIGURE 5 is a sectional perspective view of a portion of a large chord rotor blade requiring two sheets of metal to complete the skin, and showing the interlaminated construction thereof.

A skin 66 of .010" thick stainless steel sheet stock envelops the entire assembly and has its aft edges adhesively bonded together at the trailing edge of the blade either directly or through the medium of a faying strip 67 of phenolic and a metal loop 68. While in smaller size blades the skin can be made of a single sheet, larger sizes require the use of two sheets, since stainless steel sheet stock is presently available only in widths up to 36". When two sheets are used, an interlaminated construction is preferred, with the lap edge 69 on the under side of the blade, as shown in FIGURE 5. Whether one or more sheets are needed for the skin, however, one of the features of the construction is that the skin constitutes the outermost lamination of the spar structure, which is contemplated by the design calculations. The continuation of this outermost lamination to the trailing edge and its adhesive bonding to the secondary stiffening structure and in the forming of the trailing edge manifestly improves the structural integrity of the entire assembly.

A suitable heat and pressure set adhesive material is used as the fastening medium throughout the blade assembly. A faired or "revolution" tip 70 and a trim tab 71, shown in FIGURE 1E, complete the blade structure.

As is evident, the structure lends itself readily to the inclusion of anti-icing features utilizing the hollow enclosed leading edge portion of the blade or spar and a suitable exhaust port in the tip. Its hollow construction also makes it readily adaptable to rotor systems using reaction propulsion at the blade tips, as well as to those using mechanical transmission at the hub.

The laminated structure of the spar enables almost unlimited variations in weight and strength characteristics. Structural taper in blade 31 is achieved by stepping or dropping off laminations 32 at progressvely greater radial distances from the root or inboard end of the blade, as dictated by design criteria, thus permitting concentration of strength where needed and ready elimination of weight and material where strength is not needed. Such means of achieving taper together with adhesive fastening facilitates elimination of local stress concentration points in the structure which result from mechanical fastening methods and other types of construction and which would lead to mechanical or fatigue failure. Improved vibration characteristics may also be readily achieved with the construction of this invention, since additional laminations may be added at any critical points to shift natural frequencies and thus avoid highly stressed conditions. Reinforcing strength as needed inboard of the blade is also easily obtainable in any degree indicated by the use of supplemental laminations 35 as previously described.

In order to maintain proper blade strength and balance with the tapered structure described, and with the constant planform blade 31, the spar web 33 is positioned at an angle to the lengthwise axis of the blade, being relatively more forward at the tip than at the rott. The web position at the root is, for instance, approximately 30% of the chord aft of the leading edge, and moves progressively forward as it extends toward the tip until at the tip it is at a point, for instance, approximaely 16.8% of the chord aft of the leading edge. Such positioning requires a progressive decrease in the vertical dimension of web 33 because of the progressive decrease in the inside vertical dimension of the nose contour proceeding toward the leading edge.

Fullest possible realization of the many advantages afforded by the laminated spar structure described above is dependent upon the successful development of each component part of the blade, and particularly the secondary stiffening structure. The stiffening structure has an important bearing on the overall blade weight and balance. It has a fourfold function: (1) to accurately form the aft portion of the blade airfoil section, (2) to carry chordwise loads from the aft portion into the spar, (3) to permit the skin to carry centrifugal forces of the aft structure elements longitudinally of the blade to the inboard fittings, avoiding skin buckling and failing, and (4) to increase the capacity of the blade to carry inplane bending by improving stiffness and shear strength for such loads. While the stiffening structure must satisfactorily perform the above tasks, it must be as light as possible, and it must have flexibility sufficient to allow the blade to bend in the flapwise direction without developing stresses above the allowable yield even though the spar develops a maximum stress at its outermost fiber which is nearer the neutral axis than the section just aft of the spar. This arrangement allows development of maximum stress in the spar without rupture in the thin gage skin aft of the spar. The continuous beaded stiffener members 60 were devised as best suited to achieve this overall objective in conjunction with blade 31. Each member comprises a single thin piece of aluminum with die-formed semi-circular impressions or beads 63 therein, running in a transverse or chordwise direction and spaced approximately every one and a half inches along the length or spanwise direction. Sufficient strength is incorporated into these light stiffener members by the addition of reinforcing stainless steel caps 61 in chain strip form and placed along the beads 63 at their most highly stressed points. Necessary taper of beads 63 near the trailing edge is to maintain airfoil contour shape of the stiffener members 60, and to provide clearance where top and bottom stiffeners approach each other and termination of the beads short of the trailing edge is accomplished by the cutting of slots 72 into the aft ends of the beads 63 and by deformation of the aft ends of the beads to form "frog-legs" 73, as shown in FIGURE 3. Excess metal between slots 72 resulting therefrom is compensated for by pressing small deformations 74 therein. Shear tabs 62 along the forward edges, as previously described, with dot reinforcements 75 of stainless steel as may be desired, complete the structure of the stiffener members 60.

In the bonding of stiffner members 60 to skin 66, sufficient pressure is applied, as hereinafter described, to cause the concave depressions 76 of the stiffner beads to flatten toward the skin portions 78 bridging such depressions. After completion of bonding and release of pressure, the concave depressions tend to resume their previous shape and draw in the skin portions bridging them, as illustrated to an exaggerated degree in FIGURE 3B. The extent of such drawing in is controllable through control of the applied pressure. A slight "dimpling" or washboard appearance is thereby produced along the span of the blade aft of the web with the dimpling running from the web toward the trailing edge to the position wherein the beads taper off into the frog-legs 73, as indicated in FIGURE 2. The effect of such dimpling on aerodynamic efficiency is inconsequential. The dimpling, however, provides, as an important feature of the blade assembly, a consequent tendency in the skin 66, in flapwise bending, to bend inwardly into the concave depressions 76 of the stiffener beads rather than to buckle outwardly and pull away from its attachment to the stiffener members along the adhesively bonded outwardly presenting flat faces 77 thereof. This system obviates the necessity of use of "boxes" or separate sections making up the portion of the blade aft of the spar and attached only to the spar adjacent to each other throughout the span. The "box" system creates a notch effect causing induced air leakage losses and fatigue risers; the box sections are stiff; there is resulting nonuniformity of stress in the spar and reduced blade flexibility in the plane of rotation requiring increased damping. The dimpling system does away with these numerous disadvantages.

Figure 4:
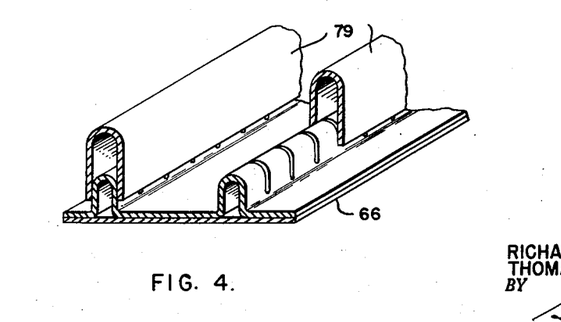
FIGURE 4 is a sectional perspective view of a portion of an alternative stiffener structure, the cap channel strip type, with associated skin portion.

Note that the effect of the changing position of the spar web 33, described above, requires the chordwise dimension of the stiffener members 60 to increase correspondingly from root end to tip. However, since the contour of blade 31 is unchanged from root to tip, only one master stiffener die need be made. The forward end of the stiffener sheet can then be cut to fit just aft of the web. An alternative type of stiffener structure is shown in FIGURE 4. This type, the cap and channel strip type, is most readily adapted to use in a tapered blade, since the cap strips 79 can be readily cut to fit the varying contour.

The width of the glue line between the aft edges of the skin 66 at the trailing edge of the blade has a maximum value for highest strength in any particular type of construction, dependent upon the thickness of the skin and material being bonded together. Faying strip 67, above mentioned, in such thickness as may be appropriate, is inserted between the skin surfaces at the trailing edge to achieve the optimum value of the ratio between glue line width and thickness of material being bonded. Metal loop 68 may be provided as support for the skin contour change into the trailing edge and to improve trailing edge stability. Reinforcing strip 80, indicated in FIGURE 1, lying along the trailing edge internally of the inboard portion of the blade, may be used in support of the root retention system, as needed.

Fullest possible realization of the many advantages afforded by the structure of this invention is further dependent upon an adequate assembly process and suitable apparatus for carrying out such process. Careful application of heat and pressure to mating surfaces is essential to proper adhesive bonding thereof, and the process contemplated by this invention calls for progressive sequential steps in such application, starting with the tip of the nose and proceeding aft toward the trailing edge of the blade assembly. The apparatus contemplated by this invention facilitates this application of heat and pressure, is simple, flexible and easy to make, and at the same time provides a reliable external mold in permanent form which will insure accurate aerodynamic contours, consistent blade densities and overall uniformity from blade to blade in production quantities.

Figure 6:
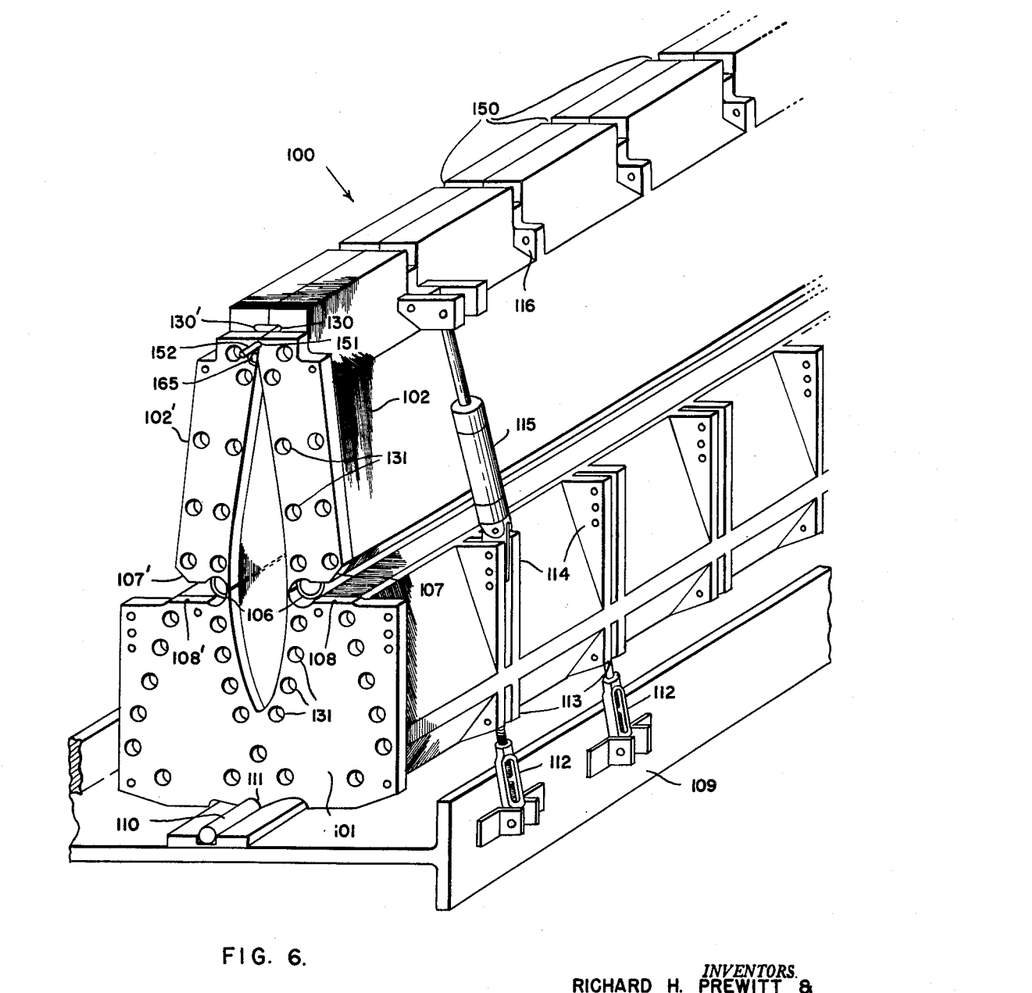
FIGURE 6 is a perspective view of a portion of the composite hinged metal laminated external mold for the assemby of the rotor blade of FIGURE 1.
Figures 6A, 6B:
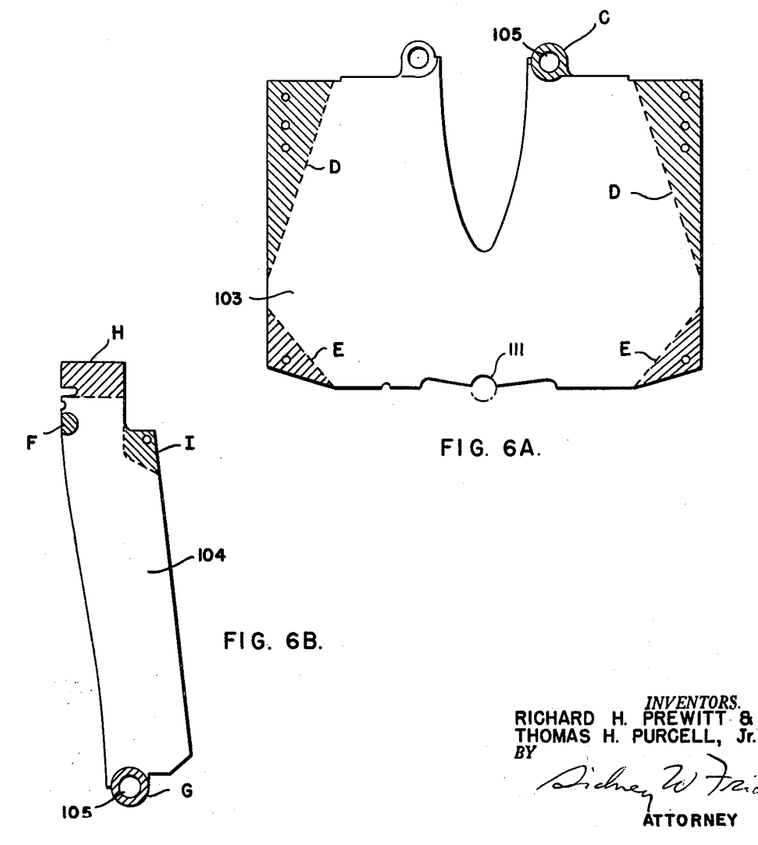
FIGURE 6A is a plan view of the basic lamination a plurality of which form the base portion of the mold of FIGURE 6.
FIGURE 6B is a plan view of the basic lamination a plurality of which form each of the side portions of the mold of FIGURE 6.
Figure 7:
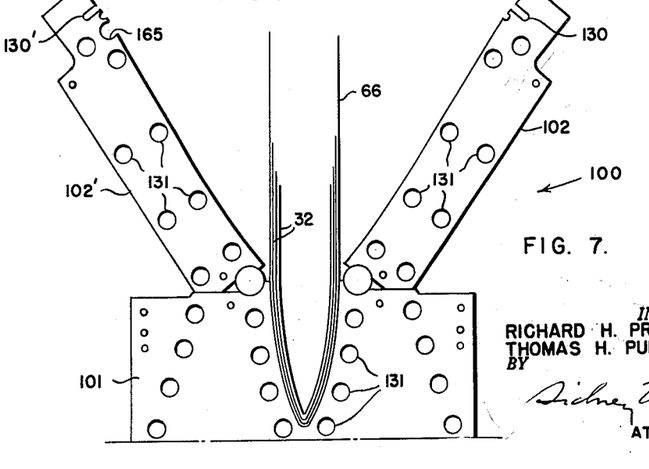
FIGURE 7 is a cross-sectional elevation of the mold of FIGURE 6 with its side portions in open position for loading of the rotor blade parts, and showing placement of the laminations forming the skin and the leading edge portion of the blade.

FIGURE 6 shows a fragmentary perspective view of a preferred form of composite external mold 100. Mold 100 is built and assembled in three sections, one which may be designated the base section 101 defining the entire nose or leading edge portion of the blade, and the other two which may be designated side sections 102 and 102' complementing each other to define the remaining or aft portion of the blade when assembled to the base section 101 and in closed position as shown in FIGURE 6. Each of sections 101, 102 and 102' has a laminated construction built up of stampings of metal sheet, having appropriate cross-sectional shapes and thicknesses, held together by through bolts. Only two basic lamination shapes are required for completion of the mold for rotor blade 31. FIGURE 6A shows the basic lamination 103 required in the fabrication of base section 101. Shaded portions of this basic lamination, designated C, D, and E, are selectively eliminated from requisite numbers of the basic lamination 103 to form four variations thereof required for the assembly of base section 101 as shown in FIGURE 6. FIGURE 6B shows the basic lamination 104 required in the fabrication of side sections 102 and 102'. Shaded portions of this basic lamination, designated F, G, H, and I, are selectively eliminated from requisite numbers of the basic lamination 104 to form eight variations thereof required for the assembly of side sections 102 and 102' as shown in FIGURE 6. Laminations retaining shaded portions marked C and G in FIGURES 6A and 6B respectively have holes 105 formed therein, and in assembly alternate in side by side position with laminations from which such shaded portions have been eliminated, with laminations containing holes 105 assembled into side sections 102 and 102' in such position as to complement those laminations not containing holes 105 or shaded portion C assembled into base section 101, and vice-versa. Side sections 102 and 102' are assembled to base section 101 in hinged relationship by means of the continuous hinge structure thereby created, as shown at 106 in FIGURE 6. Metal rod inserts complete the hinge assembly. End portions 107 and 107' of the laminations in the assembly of side sections 102 and 102' mate with structural portions 108 and 108' of the laminations in the assembly of base section 101 to provide stops limiting the extent of opening of side sections 102 and 102', as shown in FIGURE 7. It will be evident that this laminated mold construction facilitates adjustment of the mold to provide proper blade twist, and its ready adaptability to blades of different lengths, sizes, shapes, etc.

Composite mold 100 is mounted on I-beam 109 as shown in FIGURE 6. Half-round cutout 111 in the bottom of basic lamination 103 provides in assembly a half-round groove running lengthwise along the bottom of mold base section 101. The mold is mounted on I-beam 109 in pivoted relationship therewith through such groove and rod 110 so as to have freedom of movement about rod 110 as limited by the shape of lamination cutout adjacent to half-round cutout 111 and the rod mounting cooperating with each other. Turnbuckles 112 connect the base section 101 to each side of I-beam 109 at projections 113 at intervals throughout the length of the mold. Selective adjustment of turnbuckles 112 produces the desired twist in mold 100. Holes 131 are provided throughout the length of mold 100, through which hollow tubes for supplying steam heat to the mold are placed. Such tubes double as through bolts holding together the laminated construction of the mold. Adjustment of turnbuckles 112 for twist is accomplished with such through bolts loosened to permit differential movement of adjacent laminations. Hydraulic cylinders 115, connected between base section 101 and side sections 102 and 102' through projections 114 and 116 respectively, at intervals throughout the length of the mold provide ready means for opening and closing side sections 102 and 102', and maintaining them in any desired position.

Figure 8:
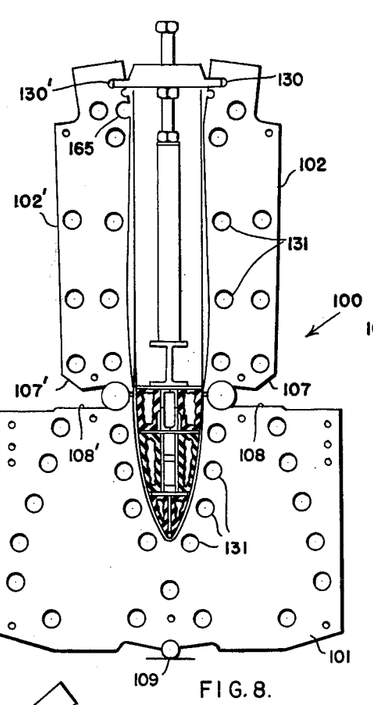
FIGURE 8 is a cross-sectional elevation of the mold of FIGURE 6 with its side portions in position for the bonding of the leading edge portion of the blade, and showing the blade parts and the internal nose pressure apparatus in position.
Figures 10, 11:
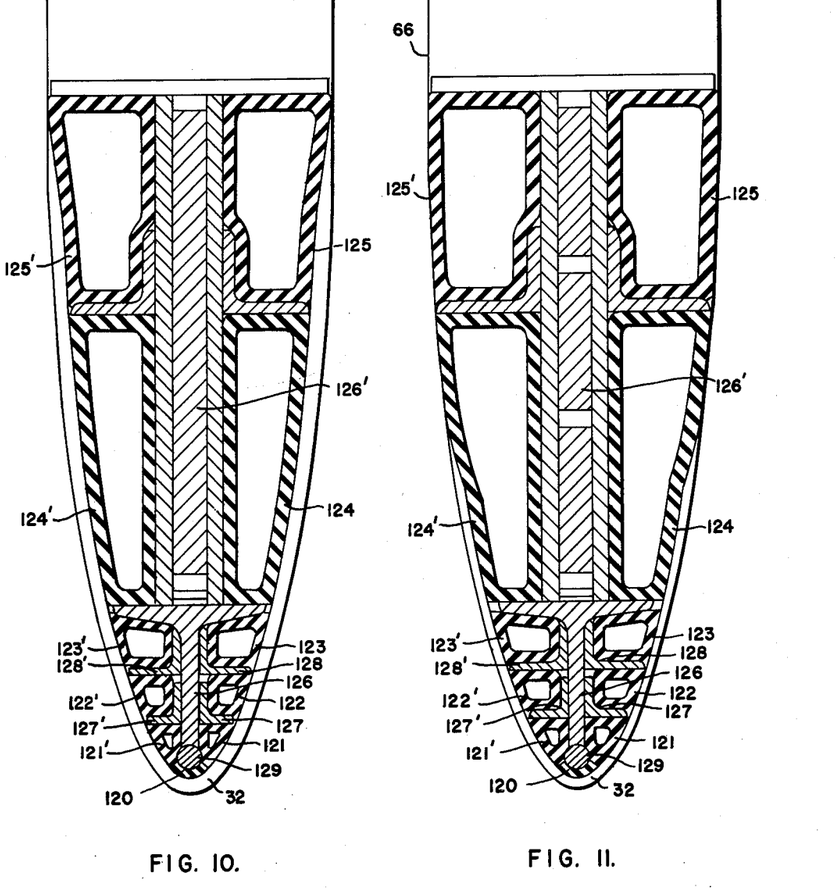

The first three stages of the blade assembly process utilize the composite mold 100 in the position shown in FIGURE 8. Skin 66 and the spanwise nose laminations 32, which have been cleaned, coated with adhesive and preformed to the nose contour in preparatory operations, are positioned in base section 101 of the open mold as shown in FIGURE 7. Pressure apparatus, shown in cross-section in FIGURES 10 and 11, is installed within the hollow nose portion of the blade components so formed, for the purpose of forcing the skin 66 and laminations 32 firmly and positively against the mold contour, and supplying the requisite pressure for bonding. Such apparatus consists essentially of a sectional strip of solid rubber 120 placed in the blade leading edge to assume the internal contour thereof, hollow rubber pressure hoses 121 and 121', 122 and 122', 123 and 123', 124 and 124', and 125 and 125', together with associated steel angular channel section strips 126, 126', 127, 127', 128 and 128', functioning to maintain positioning of the rubber hoses for requisite uniform pressure, and to transmit uniform mechanical pressure to the solid rubber nose strip 120, as shown. (Angles 127, 127', 128 and 128' are fastened to or made integral with strip 126; strip 126' has similar angular projections between hose pairs 124 and 125, and between 124' and 125', as shown.) For the latter purpose, the leading edge portion 129 of channel strip 126 terminates in a circular cross-sectioned shape. The requisite mechanical pressure is supplied by a screw-actuated apparatus accurately positioned and firmly locked into the side sections 102 and 102' of the mold with the aid of slots 130 and 130' in the trailing edges thereof, as shown in FIGURE 8, side sections 102 and 102' being moved from their positions shown in FIGURE 7 to the positions of FIGURE 8 by means of hydraulic cylinders 115, as above described.

The first stage of the bonding process requires the application of pressure to the most forward portion of the leading edge of the blade along its span, which is accomplished through rubber strip 120 by the mechanical pressure means aforesaid. Heating of the nose portion under such pressure to complete its bonding is then accomplished by introduction of steam through the tubes in holes 131 provide throughout the mold base section 101 in locations sufficiently close to the internal surface thereof to cause uniform and efficient heat transfer to the blade components. Next in order in this first stage of the blade assembly process are the progressive sequential steps of air inflation of hoses 121 and 121' to the requisite pressure and application of heat by introduction of steam through tubes in holes 131 in the mold base section 101 located adjacent to the blade portions under such pressure, and then, successively, inflation of hose pairs 122 and 122' and heating of corresponding blade portions, and so on, completing the bonding of blade portions adjacent to hose pairs 123 and 123', 124 and 124', and 125 and 125', respectively. This completes the first stage of the assembly process, and channel section strip 126' and pressure hoses 124, 124', 125 and 125' are then removed.

Figure 12:
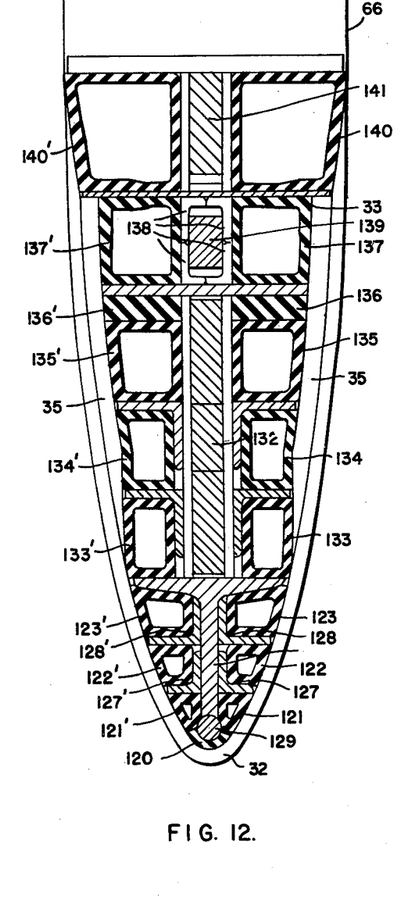
FIGURES 12 and 13, and 14 and 15, are cross-section views corresponding respectively to those of FIGURES 10 and 11, but showing respectively the placement therein of pressure apparatus and tools used in the second and third stages of the process of assembly of the blade.
Figure 13:
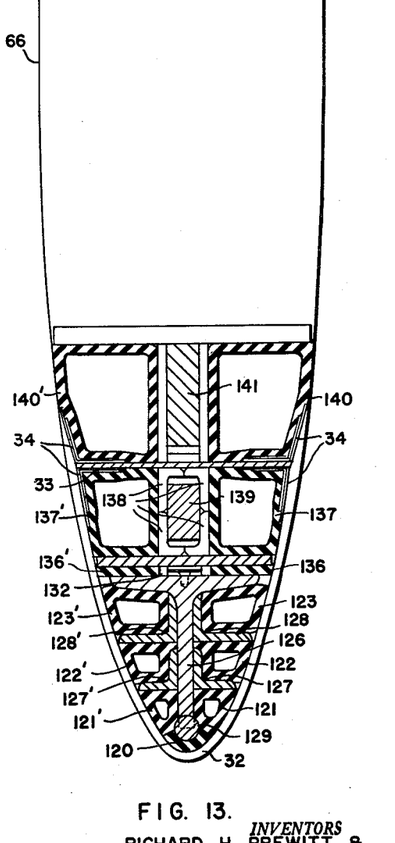

The second stage of assembly, illustrated in FIGURES 12 and 13, accomplishes the installation of additional root end laminations 35, the spar web 33 and supporting angle laminations 34. Replacing channel section strip 126' and associated pressure hose pairs, tapered steel angular channel section strip 132 and blind hollow rubber pressure hoses 133 and 133', 134 and 134', and 135 and 135', also tapered, together with additional root end laminations 35 which have been previously cleaned and coated with adhesive, are positioned as shown in FIGURE 12, the blade tip portion of channel section strip 132 also being visible in FIGURE 13. Associated tapered solid rubber strips 136 and 136' are positioned as shown in FIGURES 12 and 13. Next in order are positioned hollow rubber pressure hose pair 137 and 137', separated by steel kunckle joint assembly comprising four right angle strips 138 positioned to form hollow rectangular cross-sectioned tubular strip, the hollow portion of which is occupied by solid steel rectangular cross-sectioned bar 139. The purpose of this knuckle joint will be explained below. Supporting angle laminations 34 (shown in FIGURE 13 but not in FIGURE 12) and spar web 33, previously cleaned and coated with adhesive, are then positioned, and finally hollow rubber pressure hose pair 140 and 140' and associated steel angular channel section strip 141. Mechanical pressure is once again applied as previously described, and progressive sequential application of air pressure and heat, substantially as previously described, completes the bonding of the additional root laminations 35, the supporting angle laminations 34, and the spar web 33 to the structure. Pressure hose pair 140 ad 140' and channel section strip 141 are then removed.

Figure 14:
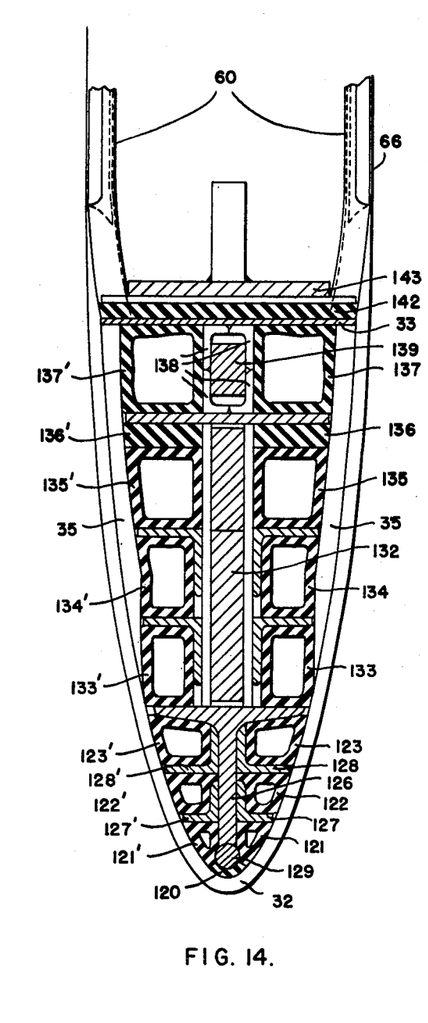
Figure 15:
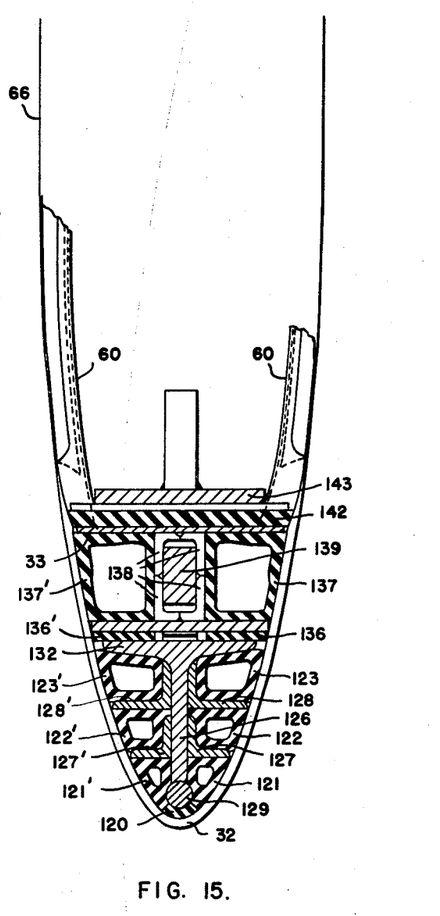

The third stage of assembly, illustrated in FIGURES 14 and 15, accomplishes the bonding of the stiffener members 60 in the area of the spar web 33 through the medium of a scalloped rubber pad 142 and steel T plate 143, by application of mechanical pressure and heat substantially as described above. Dot reinforcements 75, if included, are also bonded in this stage, having been previously tack cemented to shear tabs 62.

Figure 9:
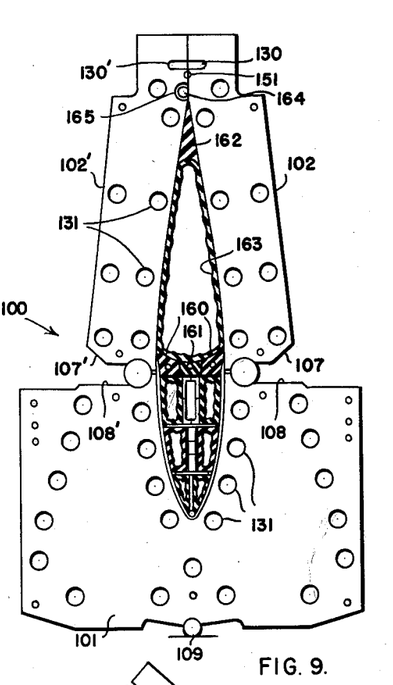
FIGURE 9 is a cross-sectional elevation of the mold of FIGURE 6 with its side portions in closed position for the final bonding operations in the blade assembly process, and showing the blade parts and the internal pressure apparatus used in such operations in position.
Figures 16, 17:
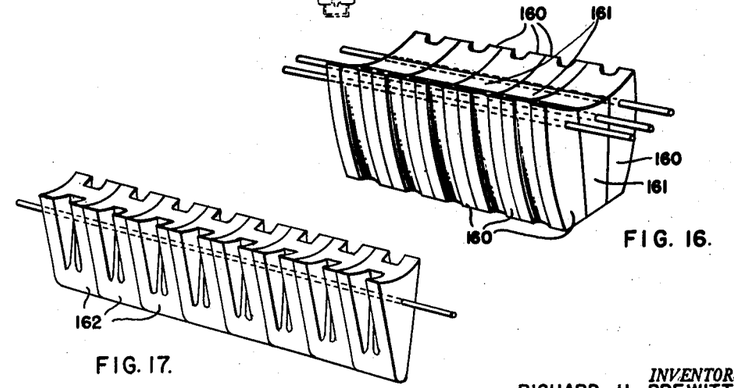
FIGURE 16 is a perspective view of a portion of the cable assembly of pressure blocks and wedges comprising the internal packing just aft of the spar web of the blade and used in the final stage of the blade assembly process.
FIGURE 17 is a perspective view of a portion of the cable assembly of pressure blocks comprising the internal packing in the trailing edge portion of the blade and used in the final stage of the blade assembly process.

The final stage of assembly is accomplished with the composite mold 100 in closed and locked position, as shown in FIGURES 6 and 9. Slots 150 are spaced at intervals along the trailing edge of the mold into which closing bolts may be inserted and tightened to effect positive locking of the mold. Accurate alignment of the mold in closed position is facilitated by the provision of aligning slot 151 located in the trailing edge of the mold and into which metal rod 152 is inserted. Stiffener members 60 with reinforcing caps 61, previously tack cemented in place, internal reverse strip 65, faying strip 67 and metal loop 68 are all positioned for bonding in this stage, having been previously coated with adhesive. Molded rubber pressure blocks 160 and wedges 161, in cable assembly as shown by fragmentary perspective view in FIGURE 16, are located just aft of the spar web 33 and molded rubber pressure blocks 162, also in cable assembly as shown in fragmentary perspective view of FIGURE 17, are located in the trailing edge, and a laige hollow rubber pressure hose or bag 163 is positioned between the assemblies of blocks 160 and wedges 161, and blocks 162. Due to progressive forward positioning of spar web 33, blocks 160 and wedges 161 increase gradually in length proceeding outboard. This enables pressure bag 163 to be uniform in cross-section throughout the length of the blade. Small pressure hose 163 is threaded through hole 165 in the mold trailing edge to provide requisite pressure for the bonding at the blade trailing edge. The bonding or curing process is then completed by application of pressure and heat as before.

After complete curing of the blade shell as described, the internal apparatus is removed in the following order and manner. Pressure bag 163 and hose 164 are readily pulled through, followed by withdrawal of the assemblies of pressure blocks 160 and wedges 161, and pressure blocks 162. Tightening of the cable in the assembly of wedges 161 frees the wedges from positions between blocks 160, thus allowing ready removal of wedges and blocks. This completes removal of all apparatus aft of the spar web 33. The next phase of unloading begins with the removal of rectangular bar 139 from the knuckle joint assembly, and its replacement with a rubber hose which is expanded by air pressure to break apart angle strips 138 forming the knuckle joint. This frees the nose packing below. The rubber hoses 121 and 121' nearest the leading edge can then be pressurized to lift the packing, thereby breaking free the remaining packing units. All of the nose packing components must be withdrawn from the root end of the blade shell.

Removal of the closing bolts from slots 150 in the trailing edge of the mold and swinging open side sections 102 and 102' then enables ready removal of the completed blade assembly for final trimming and finishing operations which include assembly of tip 70, trim tab 71 if used, and inboard closing panel and fittings.

It will be clear that the contemplated apparatus and process as described herein satisfy the rigid aerodynamic and structural requirements dictated by the blade design and yet are simple, flexible, inexpensive and highly adaptable to the fabrication of a great variety of structures, both small and large, and to quantity production thereof, with consistent high quality results.

Figure 18:
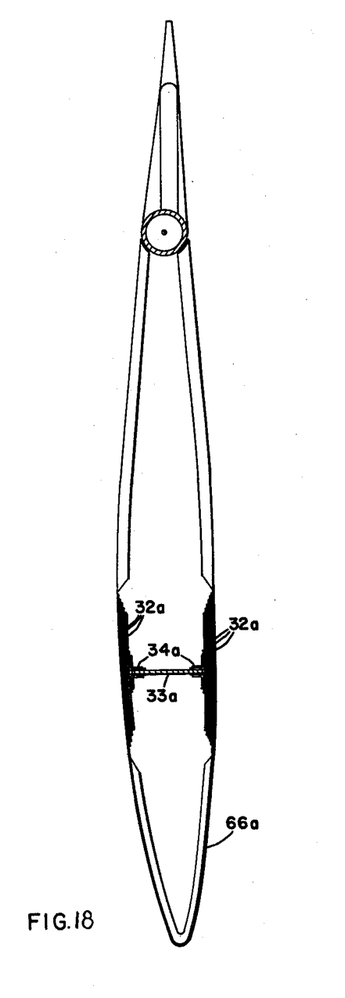
FIGURES 18 and 19 are cross-sectional views of two typical fixed wings for high speed aircraft, illustrating the adaptability of the laminated construction of the present invention thereto.
Figure 19:
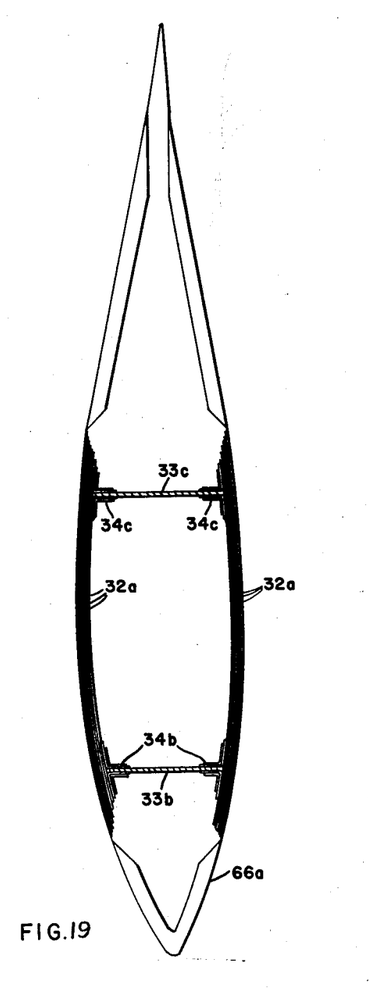

FIGURES 18 and 19 are cross-sectional views of two typical fixed wings for high speed aircraft, incorporating therein and showing the adaptability of the features of this invention. FIGURE 18 is a tip section of a single web structure, while FIGURE 19 is a root section of a double web structure, each showing the laminated construction of the main strength portion of such wings.

Having now described and illustrated one form of our invention, we wish it to be understood that our invention is not to be limited to the specific form or arrangement herein described and shown. Other modifications and advantages of the present invention both with respect to its general arrangement and detailed features which may become apparent to those skilled in the art after a reading of the foregoing specification are each intended to be embraced within the scope and spirit of this invention as more particularly defined in the appended claims.

We claim:

1. Apparatus for the assembly of an airfoil, including a composite mold which defines the external contour of the airfoil and comprises a base section and two complementary side sections and a hinge structure with the side sections being assembled to base section thereby in hinged relationship thereto, and a plurality of hydraulic cylinders connecting the side sections to the base section at intervals throughout the length of the mold, said base and side sections being built up of pluralities of laminations of thin metal sheet stampings and through-bolts holding said laminations in side by side relationship.

2. In the apparatus of claim 1, the base section of the composite mold having a half-round cross-section groove running lengthwise along its bottom surface, a foundation for said mold containing a metal rod running lengthwise thereof and mating with the said groove so as to provide limited freedom of movement of the mold about said rod, and a plurality of turnbuckles connecting the base section to each side of the foundation at intervals throughout the length of the mold.

3. In the apparatus of claim 1, the base section of the mold being built up of a plurality of a single basic lamination portions of which are selectively eliminated from requisite numbers thereof to form four variations thereof which are selectively combined to complete the base section and provide its portion of the hinge structure and projections for attachment thereto of turnbuckles and hydraulic cylinders.

4. In the apparatus of claim 1, the side sections of the mold having slots at intervals along the length of their trailing edge portions for the insertion of closing bolts, and one of said side sections having a semi-circular shaped groove running lengthwise at the trailing edge portion of the airfoil contour for the insertion of a pressure tube, with said side sections being built up of a plurality of a single basic lamination portions of which are selectively eliminated from requisite numbers thereof to form eight variations thereof which are selectively combined to complete the side sections.

5. In the apparatus of claim 1, alternate laminations of the base and side sections having circular projections with holes therein, being so assembled that the projections of the side sections interleaf with the projections of the base section to form continuous hinges, and metal rods inserted into such hinges to complete the hinged relationship assembly.

6. In the apparatus of claim 1, a plurality of holes running lengthwise through the base and side sections adjacent to the airfoil contour defining surfaces thereof with tubes for the passage of steam therethrough being inserted therein, and semi-circular grooves running lengthwise through the side sections near their trailing edge portions which meet on the closing thereof to form a circular hole, and an aligning rod inserted therein.

7. In the apparatus of claim 1, means for applying pressure internally of an airfoil positioned in the mold including a solid rubber leading edge strip, a metal channel section strip extending aft therefrom and having a circular shaped projection bearing against said leading edge strip, a second metal channel section strip extending further aft therefrom, slots in the trailing edge portions of the side sections of the mold and screw-actuated means locked therein for transmitting mechanical pressure through said channel section strips and leading edge strip to the airfoil leading edge, pluralities of hollow expandable pressure hoses, said channel section strips having pluralities of angular projections holding said pressure hoses in selected positions against the internal surfaces of the airfoil.

8. In the apparatus of claim 1, means for applying pressure internally of an airfoil having a vertical spar web and positioned in the mold including a solid rubber leading edge strip, a metal channel section strip extending aft therefrom and having a circular shaped projection bearing against said leading edge strip, a second metal channel section strip extending further aft therefrom, slots in the trailing edge portions of the side sections of the mold and screw-actuated means locked therein for transmitting mechanical pressure through said channel section strips and leading edge strip to the airfoil leading edge, pluralities of hollow expandable pressure hoses, said channel section strips having pluralities of angular projections holding said pressure hoses in selected positions against the internal surfaces of the airfoil, and a knuckle joint assembly positioned in the line of mechanical pressure transmission forward of the web comprising four right angle strips forming a hollow rectangular cross-section tubular strip and a solid rectangular cross-section bar positioned therein.

9. In the apparatus of claim 1, means for applying pressure internally of an airfoil having a vertical spar web and positioned in said mold, including a plurality of molded rubber wedges in cable assembly positioned between pluralities of molded rubber pressure blocks in cable assembly immediately aft of the spar web of the airfoil and extending spanwise thereof, a plurality of molded rubber pressure blocks in cable assembly positioned in the trailing edge of the airfoil and extending spanwise thereof, a large hollow expandable pressure bag positioned between the said blocks and wedges immediately aft of the web and the said blocks in the trailing edge, and a small hollow expandable pressure hose in the groove provided therefor in the trailing edge portion of the mold.

10. Apparatus for the assembly of an airfoil having a composite external mold which continuously defines the external contour of the airfoil, said mold comprising a base section defining the external contour of the leading edge portion of the airfoil and two side sections complementing each other to define together the external contour of the aft portion of the airfoil, an I-beam foundation with said base section resting thereon, said side sections being hingedly assembled to said base section, a plurality of hydraulic cylinders connecting the side sections to the base section at intervals throughout the length of the mold, a plurality of turnbuckles connecting each side of the base section to the I-beam foundation at intervals throughout the length of the mold, said base section and side sections being built up of pluralities of laminations of thin metal sheet stampings and throughbolts holding said laminations in side by side relationship, the several laminations being selectively provided with contours, cutouts, projections, and holes so that in assembly there are formed a contoured cutout with a half-round groove centrally thereof running lengthwise along the bottom of the base section, composite projections spaced at intervals throughout the length of the mold for the fastening of the hydraulic cylinders to the side sections and the base section and for the fastening of the turnbuckles to each side of the base section, transverse slots spaced at intervals throughout the length of the mold in the side sections mating with each other in closed position for the positioning therein of closing bolts, half slots running intermittently lengthwise of the mold in the side sections for positioning and locking in of screw-actuated internal mechanical pressure means in partially closed position, semi-circular grooves running lengthwise of the mold in the side sections mating with each other in closed position to form an aligning slot, a semi-circular groove lengthwise of one side section for insertion of a small pressure hose at the trailing edge of the airfoil, a continuous hinged structure assembling each side section to the base section with alternate interleavings of projections containing holes in alternate side section laminations with projections containing holes in alternate base section laminations, and end portions of the side sections and structural portions of the base section mating with each other to provide stops limiting the extent of opening of the side sections, metal rods inserted in the hinged structures of the side sections and base section to complete the hinged assemblies, and a rod extending lengthwise of the I-beam foundation and mating with the base section half-round groove so that the mold has limited freedom of pivotal movement about said rod relative to said I-beam, the contoured cutout of the base section coacting with the I-beam to provide stops limiting the extent of such pivotal movement.

11. In the apparatus of claim 10, means for applying uniform mechanical pressure internally of the most forward portion of the leading edge of an airfoil being assembled in the mold including a solid rubber leading edge strip placed in the airfoil leading edge positioned in the base section to assume the internal contour thereof, a metal channel section strip extending aft therefrom and having a circular cross-section shaped projection bearing against said leading edge strip, a second metal channel section strip bearing against said first mentioned channel section strip and extending further aft therefrom, an I-beam channel strip bearing against said second mentioned channel strip and extending further aft therefrom, an elongated bar bearing against said I-beam channel strip and extending further aft therefrom, and screw-actuated means including an internally threaded lock-bar positioned and locked into the half slots provided therefor in the side sections in partially closed position, and a turn-screw threadably engaged with the lock-bar and extending through the lock-bar to bear against the said elongated bar.

12. Apparatus for the assembly of an airfoil having an external mold which continuously defines the external contour of the airfoil and means for applying pressure internally of an airfoil having a vertical spar web and positioned in the mold including a solid rubber leading edge strip, a metal channel section strip extending aft therefrom and having a circular cross-section shaped projection bearing against said leading edge strip, a second metal channel section strip bearing against said first mentioned channel section strip and extending aft therefrom, pluralities of hollow expandable pressure hoses, said channel section strips having pluralities of angular projections holding said pressure hoses in selected positions against the internal surfaces of the airfoil, a knuckle joint assembly comprising four right angle strips forming a hollow rectangular cross-section tubular strip and a solid rectangular cross-section bar positioned therein the forward portion of which bears against the said second mentioned channel section strip and the aft portion of which bears against the spar web, a plurality of molded rubber wedges in cable assembly positioned between pluralities of molded rubber pressure blocks in cable assembly immediately aft of the spar web and extending spanwise thereof, a plurality of molded rubber pressure blocks in cable assembly positioned in the trailing edge of the airfoil and extending spanwise thereof, and a large hollow expandable pressure bag positioned between the said blocks and wedges immediately aft of the web and the said blocks in the trailing edge.

13. Apparatus for the assembly of an airfoil having uniform aerodynamic contour and chord, including a composite external mold which continuously defines the external contour of the airfoil and comprises a base section defining the external contour of the leading edge portion of the airfoil and two side sections complementing each other to define together the external contour of the aft portion of the airfoil, a continuous hinge assembling each side section to the base section in hinged relationship thereto, a plurality of hydraulic cylinders connecting the side sections to the base section at intervals throughout the length of the mold, the base section having a half-round cross-section groove running lengthwise along its bottom surface, a foundation for said mold containing a metal rod running lengthwise thereof and mating with said groove so as to provide limited freedom of movement of the mold about said rod, a plurality of turnbuckles connecting the base section to each side of the foundation at intervals throughout the length of the mold, said base section and side sections being built up of pluralities of laminations of thin metal sheet stampings and through-bolts holding said laminations in side by side relationship, alternate laminations of the base section and of the respective side sections having circular projections with holes therein, being so assembled that the projections of the side sections interleaf with the projections of the base section to form the continuous hinges, metal rods inserted into such hinges to complete the hinged relationship assembly, the base section being built up of a plurality of a single basic lamination form portions of which are selectively eliminated from requisite numbers thereof to form four variations thereof which are selectively combined to complete the base section and provide projections for attachment thereto of hydraulic cylinders and turnbuckles and its portion of the continuous hinges, and the side sections both being built up of pluralities of a single basic lamination form portions of which are selectively eliminated from requisite numbers thereof to form variations thereof which are selectively combined to complete the side sections and provide projections for attachment thereto of hydraulic cylinders and their respective portions of the continuous hinges.

References Cited in the file of this patent
UNITED STATES PATENTS

| | | |
|---|---|---|
| 2,203,027 | Onsrud | June 4, 1940 |
| 2,394,162 | Gassner | Feb. 5, 1946 |
| 2,549,002 | Parsons et al. | Apr. 17, 1951 |
| 2,664,593 | Larson | Jan. 5, 1954 |